United States Patent [19]

Yamamoto

[11] Patent Number: 4,935,869
[45] Date of Patent: Jun. 19, 1990

[54] FILE TRANSFER CONTROL METHOD AMONG A PLURALITY OF COMPUTER SYSTEMS

[75] Inventor: Taichiro Yamamoto, Chofu, Japan

[73] Assignee: Hitachi, Ltd., Tokyo, Japan

[21] Appl. No.: 36,583

[22] Filed: Apr. 10, 1987

[30] Foreign Application Priority Data

Apr. 16, 1986 [JP] Japan .................................. 61-85916

[51] Int. Cl.⁵ .......................... G06F 13/00; G06F 3/00
[52] U.S. Cl. .................................. 364/200; 364/260.1;
364/228.3; 364/252.4; 364/256.8
[58] Field of Search ... 364/200 MS File, 900 MS File

[56] References Cited

U.S. PATENT DOCUMENTS

| | | | |
|---|---|---|---|
| 4,417,304 | 11/1983 | Dinwiddie, Jr. | 364/200 |
| 4,418,382 | 11/1983 | Larson et al. | 364/200 |
| 4,441,162 | 4/1984 | Lillie | 364/200 |
| 4,477,882 | 10/1984 | Schumacher et al. | 364/200 |
| 4,642,758 | 2/1987 | Teng | 364/200 |
| 4,763,254 | 8/1988 | Mori et al. | 364/200 |

Primary Examiner—Raulfe B. Zache
Assistant Examiner—Glenn Richman
Attorney, Agent, or Firm—Kenyon & Kenyon

[57] ABSTRACT

In a file transfer control among a plurality of computer systems, a plurality of data sets to be transferred are stored in a transaction file by executing transfer and receiving processings by use of control records. A plurality of data sets are stored in the transaction file together with information identifying transfer destinations. A transfer file contains control records each having ID information, and in a transfer operation, when a data set is moved from the transaction file to the transfer file, a store status in the transfer file is stored in a control record having ID information identical to ID information assigned to the data set. In response to a transfer execute instruction containing ID information, the pertinent data set is read for transmission by use of the control record.

7 Claims, 8 Drawing Sheets

4,935,869

FILE TRANSFER CONTROL METHOD AMONG A PLURALITY OF COMPUTER SYSTEMS

BACKGROUND OF THE INVENTION

1. Field of the Invention

The present invention relates to a file transferring system for storing time-series data generated with a lapse of time and for transferring the data at an arbitrary point of time. In particular, the present relates to a file management method and a transfer processing suitable to transfer various kind of data each being in a small quantity.

2. Description of the Related Art

In the file control method of a conventional data processing system, individual data sets to be transferred are controlled on the assumption that each data set exists in a different file disposed for the transfer of the data set. In other words, when a file name is specified, a data set is determined. Consequently, when the same file name is to be used for a plurality of data sets in a transfer operation, the file name is required to be assigned to the new data set in place of the old data set for each transfer operation. In this case, therefore, in addition to a transfer file directly specified at a file transfer, there is required a separate transaction file on the transmission side for temporarily storing data which is generated in the system and which cannot be stored in the transfer file. On the other hand, in addition to a transfer file used to receive transferred information, there is required a separate transaction file on the reception side for sequentially storing data moved thereafter from the transfer file.

However, the prior art transferring methods have the following problems.

When the kinds of data to be transferred are increased and hence the number of the files becomes greater, the control of these files is further complicated, for example, an operation to establish correspondence between the transfer files and the transaction files becomes troublesome. Particularly, in the case where a change of a magnetic tape or a replacement of a disk pack is necessary, the operator's intervention is indispensable and therefore the control of media is quite difficult in the operation. Contrarily, a method to avoid the human intervention in such a case raises a problem that the cost for the apparatuses is increased accordingly.

SUMMARY OF THE INVENTION

The present invention provides a file transfer control method for facilitating file control related to management of transferring a plurality of files in a data processing system particularly handling many kinds of data each being in a small quantity.

According to one feature of the present invention, a receiving system is provided with a transfer file and a transaction file for each communicating system performing a transfer. The transfer file includes a control record part having a key assigned to identification (ID) information of the communicating system or to a combination of the ID information and information indicating a kind of data, a transfer control header holding definition information and a transfer status (transmission or reception) of a file to be transferred, and a plurality of data control, information cells (to be referred to as entries herebelow). Each data control information cell holds information such as a store location of transfer data in a medium containing the data and a processing status and a data part for storing data corresponding to each entry of the control record part. The transaction file includes data to be transferred and a key in the control record, the key being added to the data as the destination communicating system.

With this provision, each data set is treated as a member of a file for which an address control is effected by use of a control record. As a consequence, a plurality of data sets can be stored in a transaction file.

BRIEF DESCRIPTION OF THE DRAWINGS

The present invention will be apparent from the following detailed description taken in conjunction with the accompanying drawings in which.

DETAILED DESCRIPTION OF THE PREFERRED EMBODIMENT

An embodiment of the present invention will be described with reference to FIGS. 1 to 11.

Figure 1:
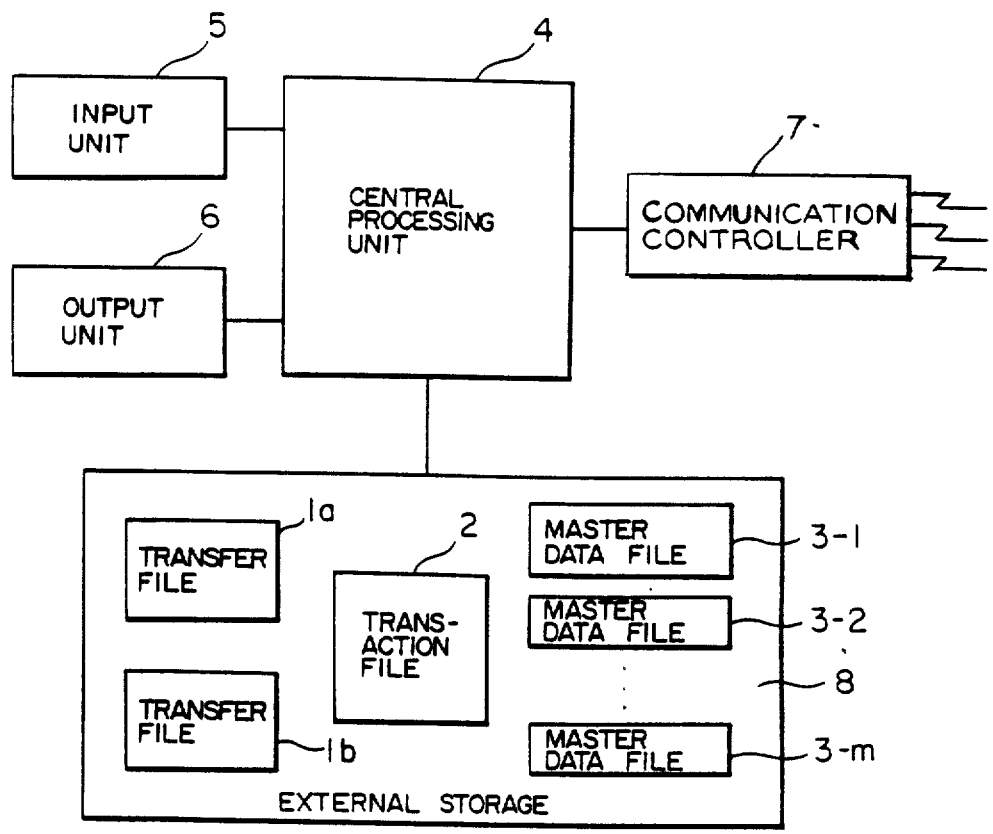
FIG. 1 is a schematic block diagram illustrating an embodiment of the present invention.

FIG. 1 is a schematic block diagram showing a data processing system to which the present invention is applied. This basic system is connected via a communication line to another similar system. The basic system comprises an external storage 8 such as a magnetic disk unit in which a transfer file 1a for transmission, a transfer file 1b for reception, a transaction file 2, and m master data files 3-i (I=1, 2, ---, m) are stored. Reference numeral 4 is a central processing unit (CPU) to control the overall system. Reference numeral 5 denotes an input unit such as a card reader used by the operator to instruct an execution of a file transfer. A reference numeral 6 is an output unit such as a line printer used when a transfer result and historical information are to be confirmed. A reference numeral 7 indicates a communication controller to control the communication lines.

Next, the transfer files 1a–1b and the transaction file 2 will be described with reference to FIGS. 2 and 3.

Figure 2:
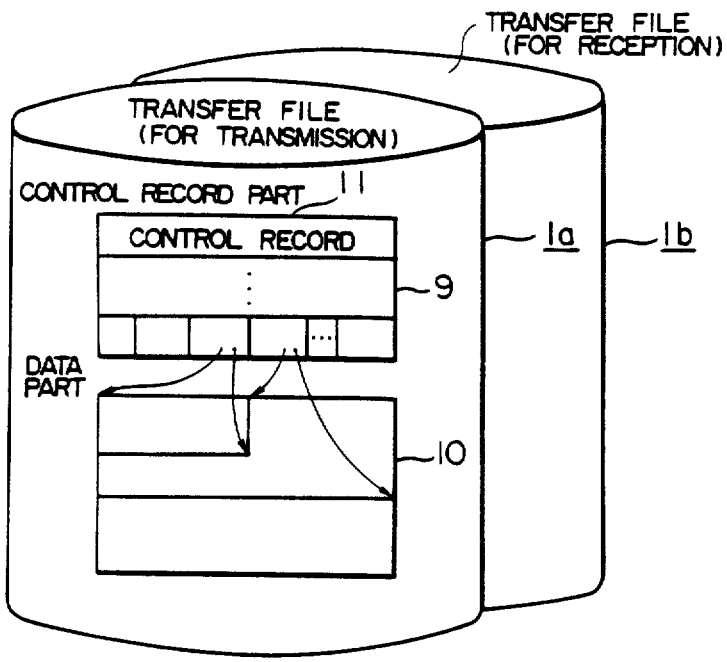
FIG. 2 is a schematic diagram illustrating a layout of a transfer file according to the embodiment of the present invention.

As shown in FIG. 2, the transfer file 1a for transmission and the transfer file 1b for reception are independent of each other and have the same file configuration. In this diagram, reference numerals 9–11 indicate a control record part, a data part, and a control record, respectively of the transfer file. The control records 11 exist in the same number, as there are communicating systems for which a transfer operation is achieved.

Figure 3:
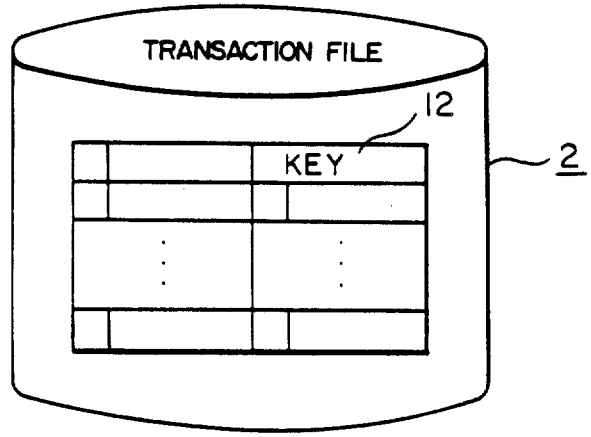
FIG. 3 is a file layout diagram illustrating the layout of a transaction file according to the embodiment of the present invention.
Figure 6:
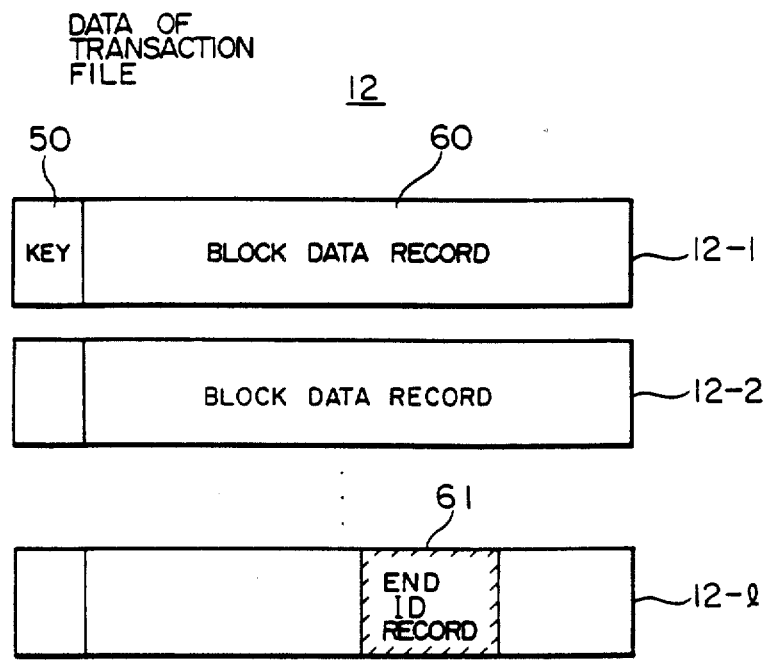
FIG. 6 is a configuration diagram illustrating a block data with a key to be subjected to a load operation.

FIG. 3 shows the structure of the transaction file 2, which is used to effect a centralized control for the transfer of the user data which are usually controlled by allocating the respective file as indicated by the reference numeral 3-i of FIG. 1. To effect an efficient file access, the user data are first collected to form a data block and then, a key corresponding to the ID information of the system communicating the data, namely, a key identical to the key of the control record 11 is added to the block, thereby configuring a block data with a key 12. The master data file 3 contains data generated by execution of a user program. The data is converted into the format as shown in FIG. 6 and is stored in the transaction file 2.

Figure 4:
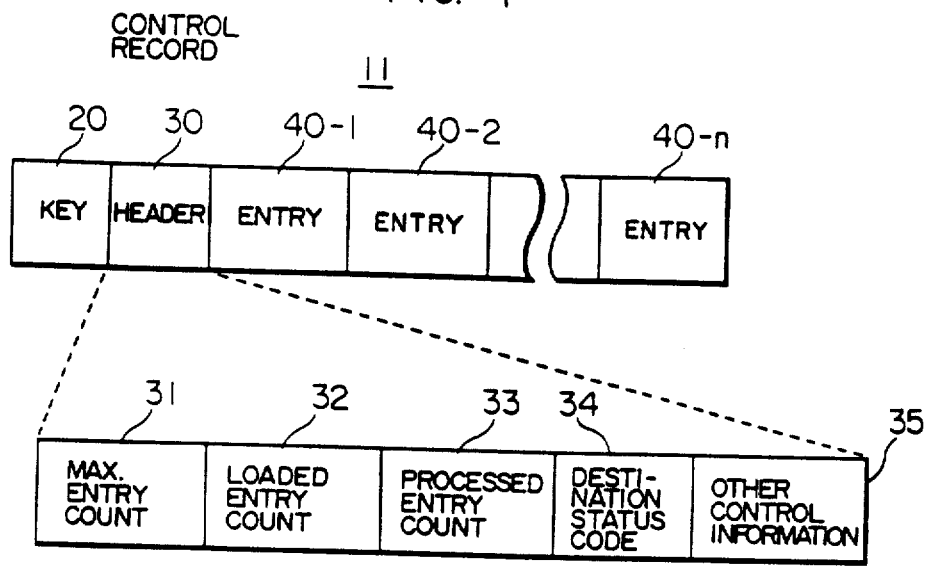
FIG. 4 is a configuration diagram illustrating a control record and transfer control information header thereof.

A description will be now given of the configuration of the control record 11. As shown in FIG. 4, the control record 11 includes a key of unique ID information assigned to each communicating system or of a combination of the ID information and a data type code, a transfer control information header 30, and a plurality of entries 40-i, which are to be described later. The contents of the transfer control information header 30 includes three entry usage information items such as a maximum entry count 31 defined beforehand, a loaded entry count 32 indicating the number of entries for which the data registration (load) to the data part 10 are completed, and a processed entry count 33 indicating the entries completely transferred to the destination, a communicating system status code 34 indicating whether or not a transfer to the communicating system is possible, and other control information 35. Since the load processing is necessary only at a transmission, the loaded entry count 32 is effective only in the transfer file 1a for transmission.

Figure 5:
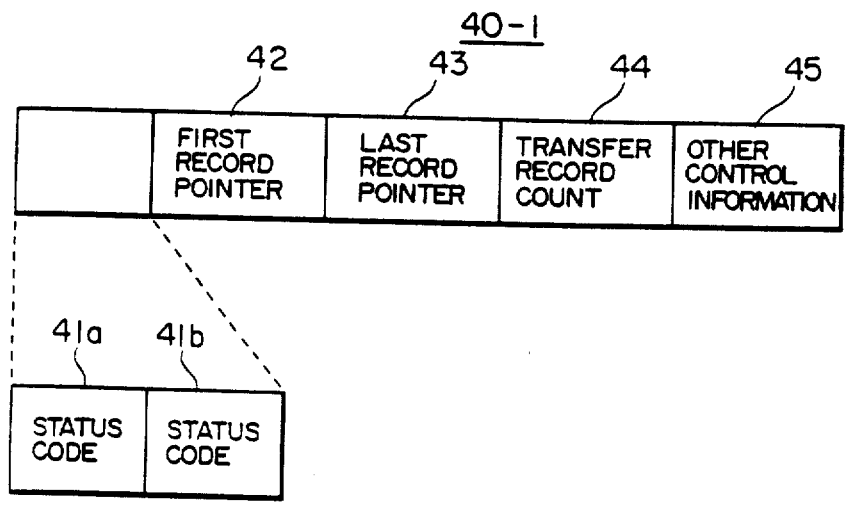
FIG. 5 is a configuration diagram illustrating entries in the control record.

FIG. 5 shows the configuration of the entry 40-i. Each entry 40-i has two status codes, namely, a first status code 41a indicating the transfer processing status including (i) unprocessed status, (ii) processing interruption status, (iii) transfer completion status, and (iv) under transfer status and a second status code 41b indicating the processing status for the data load in the transfer file 1a or 1b and the data dump to the transaction file and including (i) unprocessed status, (ii) under load status, (iii) under dump status, (iv) load completion status, and (v) dump completion status. These two status codes enable a precise transfer control such as an exclusive control for accessing the transfer file 1a or 1b.

Reference numerals 42 and 43 are pointers respectively holding a first record store position and a last record store position for data controlled by the pertinent entry 40-i in the data part 10 of the transfer file. A reference numeral 44 indicates a field holding the transfer record count disposed for the convenience to facilitate an operation to start a file transfer again from an interrupted point when the file transfer is interrupted due to the occurrence of a failure. Furthermore, other control information such as a transfer start time or a transfer end time is recorded in the entry 40-i. Consequently, the information items described above are kept stored as the transfer history.

FIG. 6 shows a group of l block data 12-i 60 ($i = 1, 2, ---, l$) with a key 50, which is a unit of a load operation. Each block data or data set is of a fixed length and is successively stored in the transaction file 2. The last block 12-l includes an end ID record 61 indicating the end of a sequence of the block data. The key 50 and the key 20 are of the same format.

Figure 7:
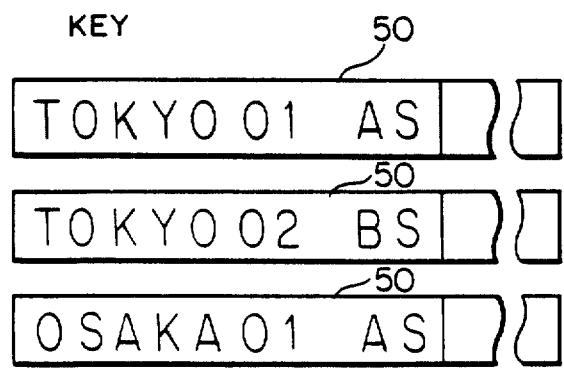
FIG. 7 is an explanatory diagram illustrating a method for specifying a key.

FIG. 7 shows an example of key specifications for the control record 11 and the block data 12 with a key. It is assumed here that TOKYO 01, TOKYO 02, and OSAKA 01 are the ID information items of the respective communicating systems and that the subsequent A and B indicate data types. The data types indicate types of data to be processed in a job, for example, A and B indicate data of acceptance of order and data of issuance of order, respectively. The last letter S is an identifier for identifying a transmission data, which is necessary for the transaction file to be commonly used for the transmission data and the reception data. An identifier R is specified for receiving data; consequently, when the transaction files are respectively disposed for transmission and reception, this identifier can be omitted.

Figure 8:
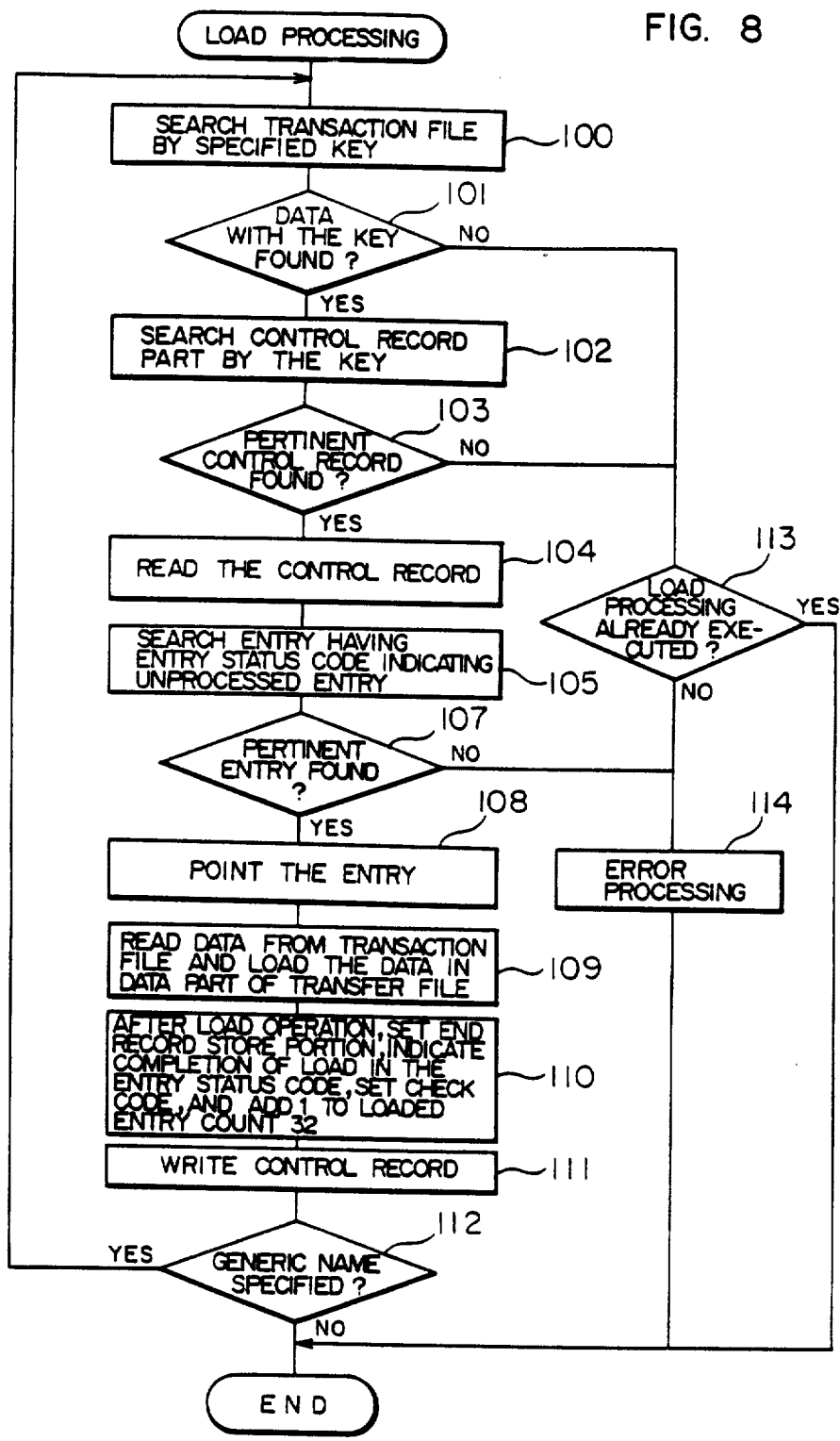
FIGS. 8 to 11 are flowcharts illustrating an embodiment of a processing procedure according to the present invention.

Next, referring to the flowcharts of FIGS. 8 to 11, the process flow executed under control of the CPU 4 in the configuration of FIG. 1 will be described beginning from the operation of a transmission according to FIG. 8.

Before a transmission of data from the transfer file 1a for transmission, the data is required to be loaded in the transfer file 1a. A data load operation is instructed from the input unit 5 by use of a control statement containing ID information of the destination system, a data type (these two items are collectively called a key), and information (data definition name) to specify a transaction file. In response to this instruction, the transaction file 2 is first searched with the destination system ID information specified by the control statement (step 100). If the pertinent block data 12-1 with a key is found (step 101), the control record part 9 is then searched by use of the key (step 102). The control records necessary for the user are beforehand loaded according to the specifications made by the user. If the pertinent control record 11 is found (step 103), the control record is read and is located in a buffer area of the memory (step 104), and then the entries thereof are searched beginning from the first entry 40-1 of the entries 40-i of which the status code 41b indicates the unprocessed status, namely, that the load processing has not been executed (step 105). In this operation, the entry count of the number of entries counted beginning from the first entry 40-1 is recorded in a counter set in the memory so as to be compared with maximum entry count 31 beforehand defined when the control record is registered. If the entry count exceeds the maximum entry count 31, similarly to steps 107, 101, and 103, the error processing is effected (step 111) and then, the processing is finished. If the load processing is completed for at least an entry during the load processing, the processing is normally finished. This is because there is provided a processing by use of a generic name specification, which will be described later.

If there exists an entry for which the load operation is possible, the address thereof is pointed (step 108).

Next, the block data 12-i with a key is sequentially read from the transaction file, a deblocking operation is effected by removing the key and the like, and each obtained data record is written in the data part 10 of the transfer file 1a (step 109). For the first record, the write position is obtained and is set to the first record store position 42 (step 109). The processing above is repeatedly carried out until the end ID record 61 is detected. When the load operation of the transmission data is completed as described above, the write position of the last record is obtained and the value thereof is set to the last record store position 43. Moreover, the status code 41b is updated to indicate the load completion status, "1" is added to the loaded entry count 32 (step 110), and the resultant data is written again in the control record (step 111), thereby completing the sequence of the load processing. In addition, in the case of the generic name specification, the processing steps 100–112 are repeatedly executed. The generic name specification indicates here a group processing in which when a key is specified with an arbitrary length from the top of the item, the portion specified as the key is used for the load processing of a plurality of control records 11 associated therewith. For example, if "TOKYO S" is specified in the case of FIG. 7, two control records respectively having keys "TOKYO 01 AS" and "TOKYO 02 BS" are selected as objectives of the processing. "... S" may be specified to select all control records for the processing. Incidentally, since the last letter "S" indicates a transmission data, this identifier S cannot be omitted in the configuration above.

Figure 9:
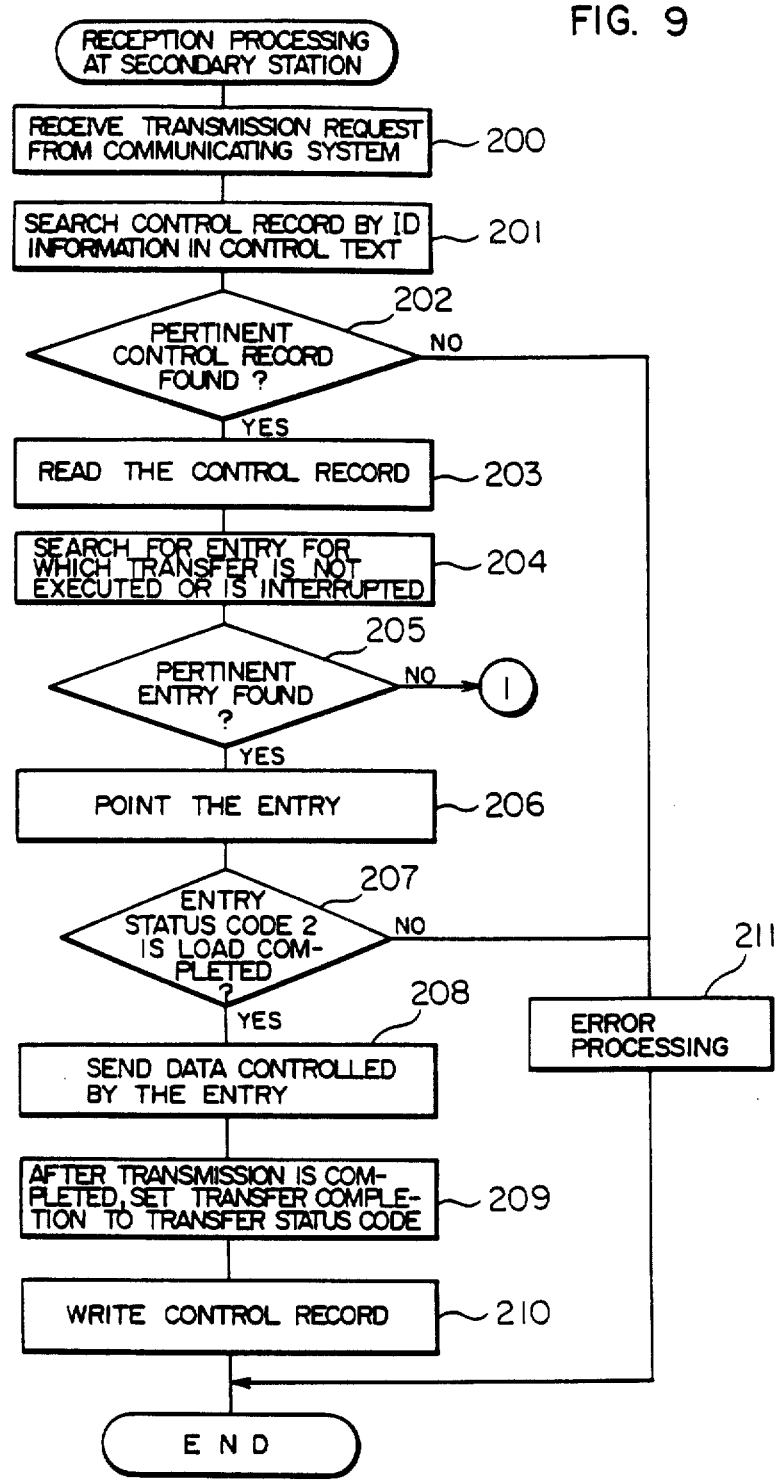

Referring now to FIG. 9, the transmission processing of a file will be described. It is assumed in FIG. 9 that the home or station in question is a secondary station. When a transmission request is recognized by receiving a control text from a communicating system (step 200), the control record part 9 is searched with the ID information in the control text (step 201). If the pertinent control record is missing (step 202), an error processing (step 211) is executed; if the pertinent record is normally found the top of an entry having the status code 41a indicating that the transfer is not executed or is interrupted is pointed (steps 204–206). This enables to guarantee the sequence of data with respect to time. If the entry satisfying the condition is missing and the entry count exceeds the maximum entry count (step 205, No), the error processing is executed (step 211). Next, a check is effected with the entry status code 41b to determine whether or not the data load operation has been completed for the entry thus positioned (step 207). If the load operation has not been completed, the error processing is achieved (step 211). If the load operation has been completed, a transmission is started from the data part 10 of the transfer file 1a by use of the record store position information items 42–43 of the entry (step 208). After the transmission is completed, the status code 41a of the pertinent entry 40-i is updated to indicate the transfer completion status and the updated control record is written (step 210), thereby completing the transmission processing.

Next, the processing for receiving will be described also on the assumption that the station in question is a secondary station.

Figure 10:
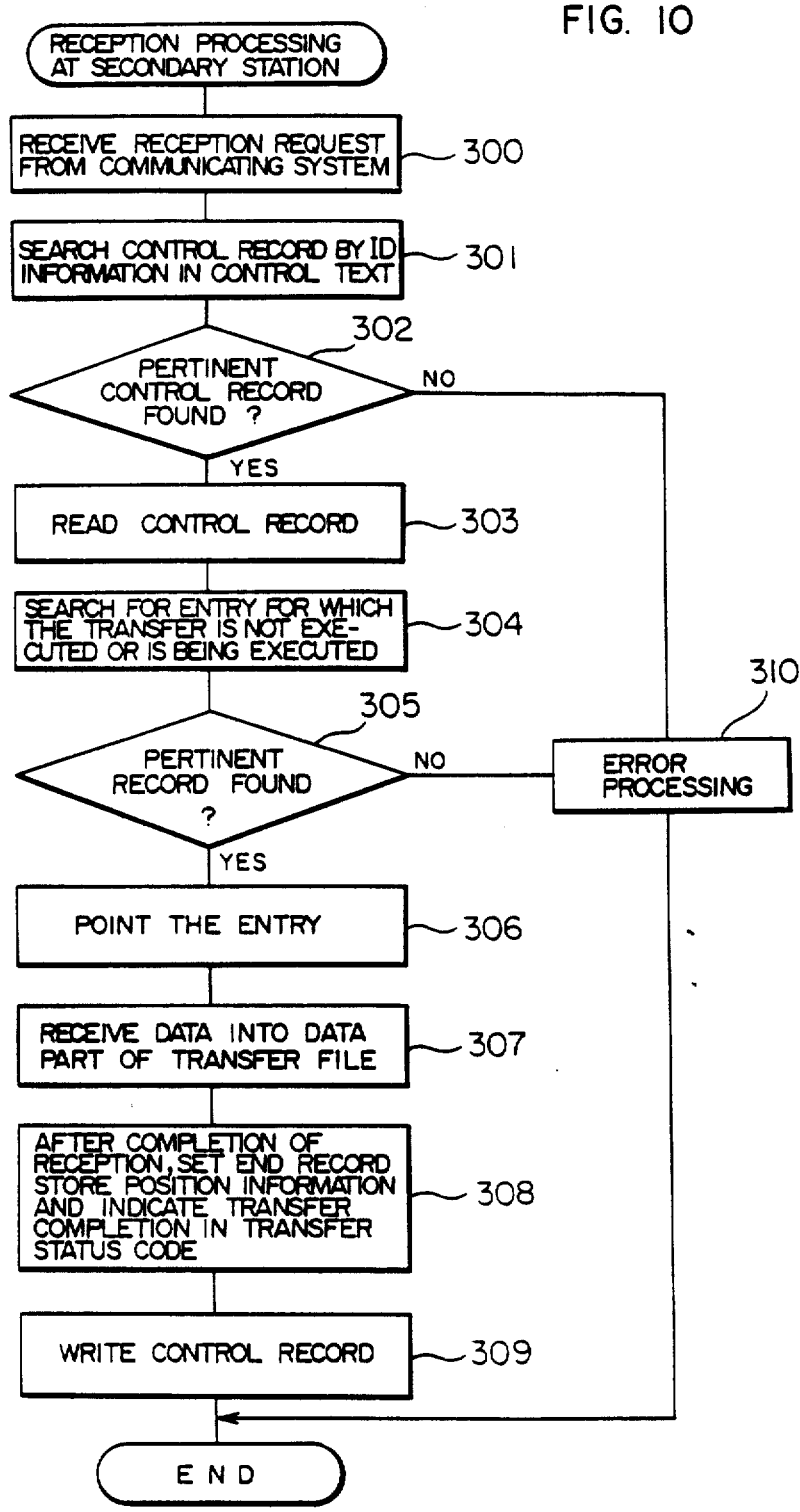
Figure 11:
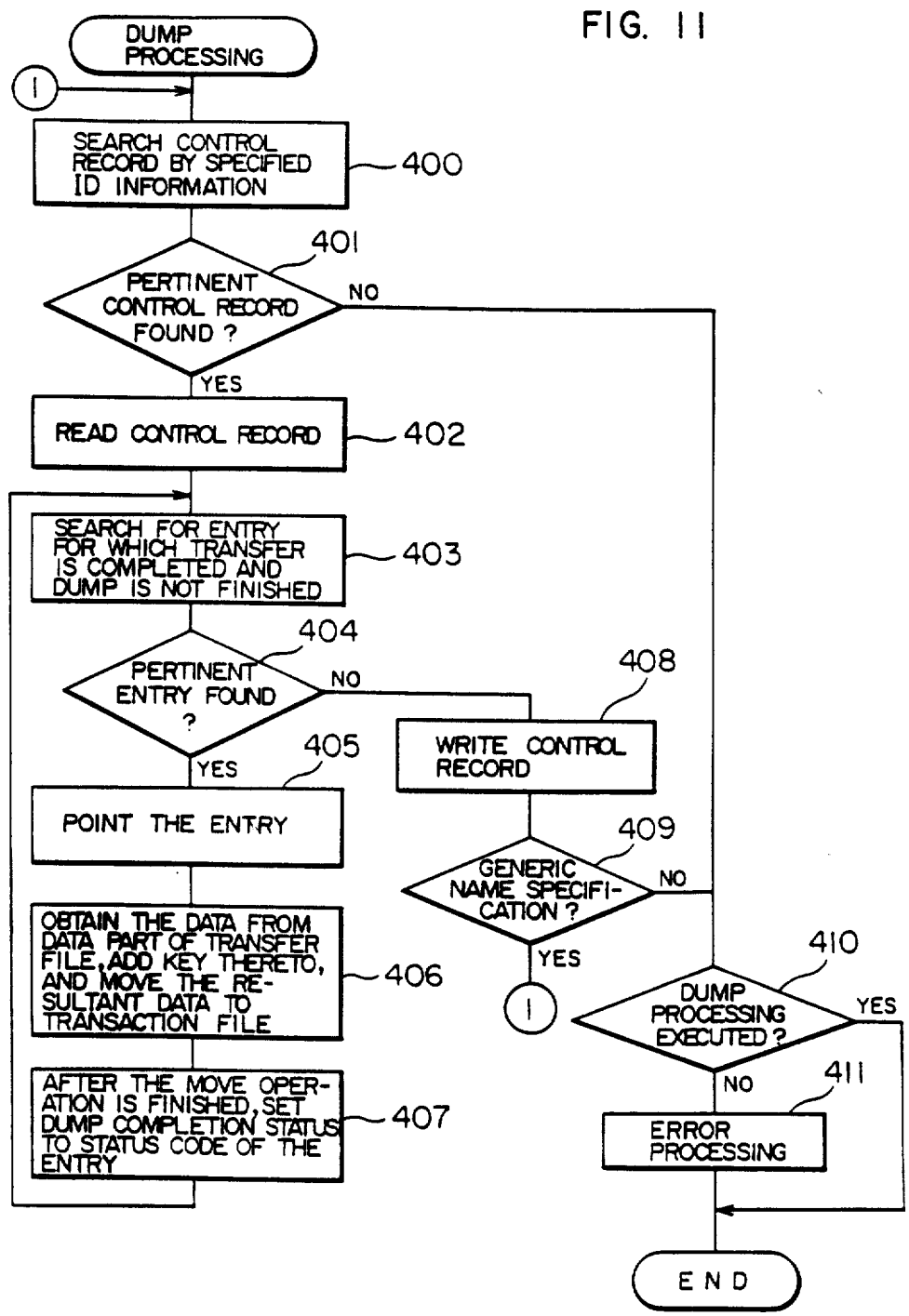

As shown in FIG. 10, when a reception request is recognized by receiving a control text from a communicating system (step 300), the system executes processing up to step 306 similar to that of the transmission processing. If the pertinent entry is missing (step 305, No), the error processing is executed (step 310). If the pertinent entry is found (step 305, Yes), the address of the entry is pointed (step 306) and the data transmitted is received and is located in the data part 10 of the transfer file 1b (step 307). In addition, after the reception is completed, the last record store position 43 is set to the pertinent entry 40-i and the status code 1 41a is updated to indicate the transfer completion status (step 308). For the first record, the write position is obtained and is set to the first record store position 42 of the entry. Thereafter, the updated control record is written (step 309), thereby completing the reception processing.

In the receiving processing described above, since the received data are entirely stored in the data part 10 of the transfer file 1b, in order to supply the data to the individual processing of the user, the data stored in the transfer file are required to be moved into the transaction file 2. This dump processing of data will be described with reference to FIG. 11.

When a control statement is received from the input unit 5 to instruct to move the received data from the transfer file 1b to the transaction file 2, a control record 11 is obtained in the similar fashion as described above (steps 400–402), the transfer status codes 41a–41b of each entry are sequentially referenced to find the top of the entry for which the transfer is completed and the dump operation is not finished, and the address of the top of the entirely is pointed. If the pertinent entry 40-i is missing (step 404) and the generic name specification has not been made (step 409), the system judges to determine whether or not the dump processing is completed at least once (step 410) and then the processing is completed. If the entry 40-i is found, the system executes a processing to move the data from the data part 10 controlled by the entry 40-i to the specified transaction file 2 (step 406). In this operation, the data records are processed according to a predetermined block and the end ID record is added to the last block. After the dump processing is finished, the second status code 41b of the entry is updated to indicate the dump completion status, thereby finishing the dump processing for an entry 40-i. The processing steps 403–407 are repeatedly carried out until the end of entry is detected.

The dump processing above can be applied not only to the processing to move the received data from the transfer file 1b for reception, but also to the processing to dump the data not transmitted from the transfer file 1a for transmission.

As described above, according to the present invention, the transaction files required to be disposed at least for the respective kinds of data in the conventional system can be summarized into a transaction file. Moreover, the data load processing and the dump processing with respect to the transfer files can be achieved without paying attention to the transfer processing for a communicating system; furthermore, a batch processing for an arbitrary grouping can be executed for the load and dump processing.

What I claim is:

1. A method for transferring a data set among a plurality of computer systems in which each computer system includes a first transfer file used for transmission and a transaction file for storing data set to be transferred, said transaction file containing a plurality of data sets each being assigned with at least identification (ID) information identifying a transfer destination, and said first transfer file containing a plurality of first control records each holding the ID information and each having a first control area for storing a data set and a transfer status, said method comprising:

a first step for reading a plurality of data sets stored in the transaction file and storing the plurality of data sets in the first transfer file;

a second step for recording a store status in the first control area of each control record holding ID information representing ID information of the plurality of data sets stored in the first transfer file, said store status including information on a store location of said data sets in the transfer file; and a third step of reading, in response to a designation of the ID information, a first control record having the ID information and transmitting a data set indicated by the first control area to a transfer destination indicated by the ID information.

2. A control method according to claim 1 wherein said first control area contains completion information for judging a portion of a data set for which a transfer is completed and a portion thereof for which a transfer is not completed and said third step transfers the portion of a data set for which a transfer is not completed and updates the completion information.

3. A control method according to claim 1 wherein said each computer system further includes a second transfer file used for a transfer and said second transfer file containing a plurality of second control records, each holding ID information identifying a transfer destination and each having a second control area for storing a store status of a data set, further comprising, a fourth step for receiving a data set transmitted in response to a specification of the ID information, storing the data set in the second transfer file, and recording a store status in a second control area of a second control record having the ID information.

4. A control method according to claim 3 wherein said fourth step includes the step of checking whether or not a second control record having the specified ID information exists and receives the data set when the second control record exists.

5. In a data processing system including a plurality of computer systems wherein each computer system comprises a central processing unit, a transaction file storing a plurality of data sets, each data set having an associated first identification key, and a transfer file storing a plurality of control records, each of said control records including a key field and a plurality of entries, each of said entries storing information regarding a data set stored in said transfer file, a method for preparing, in a first computer system, the transfer of data between at least two computer systems, comprising the steps of:

(a) selecting a key field in said transfer file;
(b) identifying a plurality of data sets in said transaction having first identification keys corresponding to the selected key field;
(c) transferring said plurality of data sets identified in step (b) to said transfer file; and
(d) updating one entry in the control record in said transfer file which corresponds to said selected key field wherein said step of updating further comprises the substep of storing an indication of a location in the transfer file of the data set which corresponds to said entry;

wherein steps (a) to (d) are implemented under the control of the central processing unit of said first computer system.

6. The method of claim 5 further comprising the step of:

(e) transmitting, to a selected computer system, a data set stored said transfer file, said data set to be transmitted being selected in accordance with a correspondence between a destination identification and information in the key field associated with said data set.

7. The method of claim 6 wherein each said control record further comprises a header portion storing information regarding a transmission of a data set to a computer system and the method further comprising the step of;

(f) updating said header portion during said transmission, to indicate the amount of said data set transmitted to the selected computer system.

* * * * *

UNITED STATES PATENT AND TRADEMARK OFFICE
CERTIFICATE OF CORRECTION

PATENT NO. : 4,935,869
DATED : 19 June 1990
INVENTOR(S) : Taichiro YAMAMOTO It is certified that error appears in the above-identified patent and that said Letters Patent is hereby corrected as shown below:

| Column | Line | |
|---|---|---|
| 1 | 10 | After "present" insert --invention--. |
| 1 | 11 | After "processing" insert --method--. |
| 1 | 44 | After "in" delete "the". |
| 1 | 53 | Change "system" to --system,--. |
| 1 | 65 | Change "control," to --control--. |
| 2 | 36 | Delete "OF THE". |
| 2 | 37 | Delete "PREFERRED EMBODIMENT". |
| 2 | 48 | Change "(I = 1, 2, ---, m) to --(i = 1, 2, ---, m)--. |
| 4 | 43 | Change "beforehand defined" to --defined beforehand--. |
| 5 | 28-29 | Change "enables to guarantee" to --guarantees--. |
| 5 | 60 | Change "code 1 41a" to --code 41a--. |
| 8 | 22 | After "stored" insert --in--. |

UNITED STATES PATENT AND TRADEMARK OFFICE
CERTIFICATE OF CORRECTION

PATENT NO. : 4,935,869

DATED : 19 June 1990

INVENTOR(S) : Taichiro YAMAMOTO

It is certified that error appears in the above-identified patent and that said Letters Patent is hereby corrected as shown below:

| Column | Line | |
|---|---|---|
| 8 | 22 | After "stored" insert --in--. |

Signed and Sealed this

Twelfth Day of November, 1991

Attest:

HARRY F. MANBECK, JR.

*Attesting Officer* — *Commissioner of Patents and Trademarks*